United States Patent
Zhou et al.

(10) Patent No.: US 9,887,825 B2
(45) Date of Patent: *Feb. 6, 2018

(54) METHOD, BASE STATION AND USER EQUIPMENT FOR TRANSMITTING CHANNEL QUALITY INFORMATION

(71) Applicant: HUAWEI TECHNOLOGIES CO., LTD., Shenzhen, Guangdong (CN)

(72) Inventors: Yongxing Zhou, Beijing (CN); Kunpeng Liu, Beijing (CN); Weijun Sun, Beijing (CN); Yunzhe Hou, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 15/242,864

(22) Filed: Aug. 22, 2016

(65) Prior Publication Data

US 2016/0359605 A1 Dec. 8, 2016

Related U.S. Application Data

(63) Continuation of application No. 13/888,683, filed on May 7, 2013, now Pat. No. 9,426,787, which is a
(Continued)

(30) Foreign Application Priority Data

Nov. 9, 2010 (CN) .......................... 2010 1 0538259

(51) Int. Cl.
*H04Q 7/00* (2006.01)
*H04W 24/10* (2009.01)
(Continued)

(52) U.S. Cl.
CPC ............ *H04L 5/0057* (2013.01); *H04L 1/001* (2013.01); *H04L 1/003* (2013.01); *H04L 1/0004* (2013.01);
(Continued)

(58) Field of Classification Search
None
See application file for complete search history.

(56) References Cited

U.S. PATENT DOCUMENTS 8,649,731 B2 2/2014 Onodera et al.
2008/0233965 A1 9/2008 Kent et al.
(Continued)

FOREIGN PATENT DOCUMENTS

CN 101272170 A 9/2008
CN 101272175 A 9/2008
(Continued)

OTHER PUBLICATIONS

3GPP TSG RAN WG1 Meeting #62 R1-104296, "Final issues of multiplexing schemes of control and data in multi-layer PUSCH transmission", Huawei, Aug. 23-27, 2010, total 3 pages.
(Continued)

*Primary Examiner* — Edan Orgad
*Assistant Examiner* — Sithu Ko
(74) *Attorney, Agent, or Firm* — Huawei Technologies Co., Ltd.

(57) ABSTRACT

Methods and apparatus are provided for transmitting channel quality information. User equipment receives a control signaling for uplink scheduling. The control signaling for uplink scheduling includes at least one modulation and coding scheme (MCS) field, a channel quality information request field, and a resource block allocation field indicating the number of resource blocks (RBs), $N_{RB}$, allocated to the user equipment for transmitting the channel quality infor-
(Continued)

mation. When the channel quality information of multiple downlink carriers is requested, the user equipment transmits only the channel quality information on the uplink shared channel according to the allocated RBs if: the MCS bit field corresponding to one transport block indicates a MCS corresponding to a retransmitted data packet; the request bit field indicates a request for the channel quality information; and the $N_{RB}$ is equal to or less than 4*N, wherein N is a positive integer and corresponds to the number of multiple downlink carriers.

22 Claims, 4 Drawing Sheets

Related U.S. Application Data continuation of application No. PCT/CN2011/081989, filed on Nov. 9, 2011.

(51) Int. Cl.

| | | |
|---|---|---|
| *H04L 5/00* | (2006.01) | |
| *H04L 1/00* | (2006.01) | |
| *H04W 72/04* | (2009.01) | |
| *H04W 72/06* | (2009.01) | |
| *H04W 72/12* | (2009.01) | |

(52) U.S. Cl.
CPC ......... *H04L 1/0026* (2013.01); *H04L 1/0027* (2013.01); *H04W 72/0406* (2013.01); *H04W 72/0413* (2013.01); *H04W 72/06* (2013.01); *H04W 72/1231* (2013.01); *H04W 72/1284* (2013.01); *H04W 72/1278* (2013.01)

(56) References Cited

U.S. PATENT DOCUMENTS

| | | |
|---|---|---|
| 2008/0310360 A1 | 12/2008 | Heo et al. |
| 2009/0073958 A1 | 3/2009 | Xu |
| 2009/0196249 A1 | 8/2009 | Kawamura et al. |
| 2009/0204863 A1 | 8/2009 | Kim et al. |
| 2009/0238121 A1* | 9/2009 | Kotecha ............... H04L 1/0026 370/329 |
| 2009/0262699 A1 | 10/2009 | Wengerter et al. |
| 2010/0115358 A1 | 5/2010 | Kotecha et al. |
| 2010/0177669 A1 | 7/2010 | Suo et al. |
| 2010/0246706 A1 | 9/2010 | Kim et al. |
| 2011/0002290 A1* | 1/2011 | Kim ..................... H04L 1/0026 370/329 |
| 2011/0103247 A1 | 5/2011 | Chen et al. |
| 2011/0103335 A1 | 5/2011 | Golitschek Edler Von Elbwart et al. |
| 2011/0205988 A1* | 8/2011 | Zhang .................. H04L 5/0053 370/329 |
| 2011/0268067 A1 | 11/2011 | Seo Dong Youn et al. |
| 2011/0271162 A1 | 11/2011 | Jitsukawa et al. |
| 2011/0299012 A1 | 12/2011 | Nam et al. |
| 2012/0176996 A1 | 7/2012 | Kim et al. |
| 2012/0188976 A1 | 7/2012 | Kim et al. |
| 2012/0327884 A1 | 12/2012 | Seo et al. |
| 2013/0250886 A1 | 9/2013 | Zhou et al. |

FOREIGN PATENT DOCUMENTS

| | | |
|---|---|---|
| CN | 101803261 A | 8/2010 |
| CN | 102130741 A | 7/2011 |
| CN | 102404192 A | 4/2012 |
| CN | 103974429 A | 8/2014 |
| EP | 2117155 A1 | 11/2009 |
| EP | 2242303 A2 | 10/2010 |
| JP | 2011510592 A | 3/2011 |
| JP | 2011521543 A | 7/2011 |
| JP | 2013526110 A | 6/2013 |
| WO | 2009096757 A2 | 8/2009 |
| WO | 2009135574 A1 | 11/2009 |
| WO | 2009154256 A1 | 12/2009 |
| WO | 2010016698 A2 | 2/2010 |
| WO | 2010066280 A1 | 6/2010 |
| WO | 2010/077051 A2 | 7/2010 |

OTHER PUBLICATIONS

3GPP TSG RAN WG1 #62bis R1-105766, "Further Discussions on UL MIMO Signaling requirements", Samsung, Oct. 11-15, 2010, total 4 pages.
3GPP TSG RAN WG1 Meeting #51bis R1-080923, "PHICH resource mapping/dimensioning for TDD", Nokia Siemens Networks, Feb. 11-15, 2008, total 3 pages.
3GPP TSG-RAN WG1 #63 R1-106368, "CQI Only Transmission on PUSCH", Qualcomm Incorporated, Nov. 15-19, 2010, total 3 pages.
3GPP TSG RAN WG1 #53 R1-082083, "'TBS=0' Signalling", Motorola, May 5-9, 2008, total 2 pages.
3GPP TSG-RAN WG1 #62bis R1-105462, "UL Transmission Modes and Signalling Requirements for LTE-A", ZTE, Oct. 11-15, 2010, total 6 pages.
3GPP TS 36.212 V9.3.0, 3rd Generation Partnership Project; Technical Specification Group Radio Access Network; Evolved Universal Terrestrial Radio Access (E-UTRA); Multiplexing and channel coding (Release 9), Sep. 2010, total 61 pages.
3GPP TS 36.213 V9.3.0, 3rd Generation Partnership Project; Technical Specification Group Radio Access Network; Evolved Universal Terrestrial Radio Access (E-UTRA); Physical layer procedures (Release 9), Sep. 2010, total 80 pages.

* cited by examiner

Base station

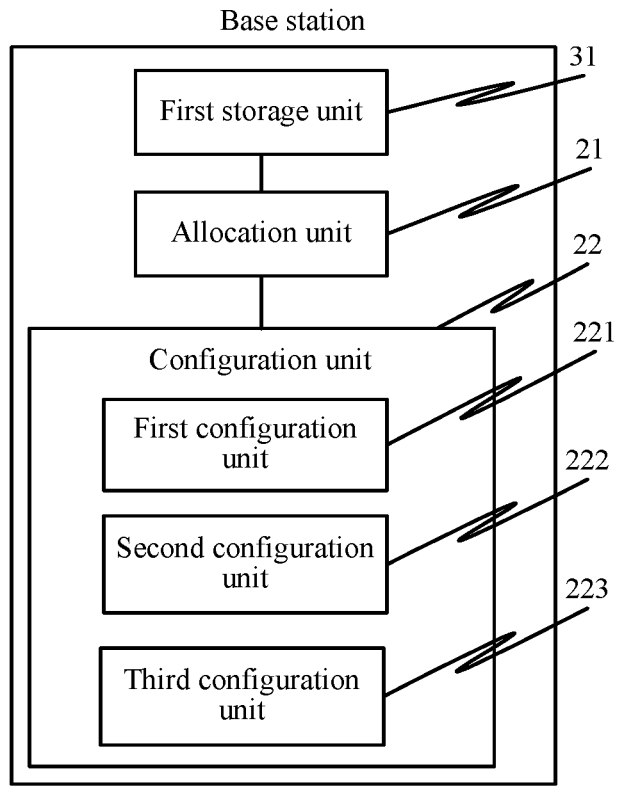

FIG. 3

| 41 A base station configures a bit filed corresponding to at least one transport block in UL-grant signaling to indicate that the corresponding transport block is disabled, and configures the UL-grant signaling to indicate a channel quality information triggering request and the number of allocated resource blocks. |

↓

| 42 The base station sends the UL-grant signaling to a user equipment, so that the user equipment can transmit only the channel quality information to the base station on an uplink shared channel according to the resource blocks allocated by the base station. |

FIG. 4

Base station

METHOD, BASE STATION AND USER EQUIPMENT FOR TRANSMITTING CHANNEL QUALITY INFORMATION

CROSS-REFERENCE TO RELATED APPLICATION

This application is a continuation of U.S. patent application Ser. No. 13/888,683, filed on May 7, 2013, which is a continuation of International Application No. PCT/CN2011/081989, filed on Nov. 9, 2011, which claims priority to Chinese Patent Application No. CN 201010538259.3, filed on Nov. 9, 2010. The aforementioned applications are incorporated herein by reference in their entireties.

TECHNICAL FIELD

The present invention relates to the field of communications technologies, and in particular to a method, a base station and user equipment for transmitting channel quality information.

BACKGROUND

In a long term evolution (LTE) system, a user equipment (UE) needs to feed back downlink channel quality information obtained by performing measurement to a base station. The channel quality information includes a channel quality indicator (CQI), a precoding matrix indicator (PMI) and a rank indication (RI). The channel quality information is also referred to as uplink control signaling (UCI).

In a method for transmitting the channel quality information in the prior art, uplink scheduling bandwidth allocated by the base station for the UCI is usually a value within a fixed range. Thus, the UE can transmit the UCI only through the fixed range bandwidth, and scheduling bandwidth cannot be adaptively allocated for the UCI according to the number of bits of the UCI. When the number of the bits of the UCI exceeds the scheduling bandwidth allocated for the UCI, the allocated resources are inadequate for transmission of the UCI, thus, transmission performance cannot be satisfied.

SUMMARY

The present invention provides a method, a base station and a user equipment for transmitting channel quality information, to implement allocating the number of resource blocks according to the number of bits of the channel quality information.

In one aspect, the present invention provides a method for transmitting channel quality information. The method includes:

when channel quality information of Y downlink carriers is needed to be fed back by a user equipment to a base station through X uplink carriers, allocating, by the base station, resource blocks to the user equipment according to the number of the bits of the channel quality information and a set of resource block numbers that corresponds to a configuration X/Y, in which X and Y are positive integers greater than or equal to 1; and configuring, by the base station, the number of the allocated resource blocks in a control signaling for uplink scheduling UL-grant, and sending, by the base station, the UL-grant signaling to the user equipment.

Correspondingly, a base station is provided, which includes:

an allocation unit, adapted to allocate, when channel quality information of Y downlink carriers is needed to be fed back by a user equipment to a base station through X uplink carriers, resource blocks to the user equipment according to the number of bits of the channel quality information and a set of resource block numbers that corresponds to a configuration X/Y, in which X and Y are positive integers greater than or equal to 1; and a configuration unit, adapted to configure the number of the allocated resource blocks in a control signaling for uplink scheduling UL-grant, and send the UL-grant signaling to the user equipment.

In another aspect, the present invention provides a method for transmitting channel quality information. The method includes:

when channel quality information of Y downlink carriers is needed to be fed back by a user equipment to a base station through X uplink carriers, receiving, by the user equipment, a control signaling for uplink scheduling UL-grant and obtaining, by the user equipment, the number of resource blocks allocated by the base station to the user equipment according to the number of bits of the channel quality information and a set of resource block numbers that corresponds to a configuration X/Y, in which X and Y are positive integers greater than or equal to 1; and transmitting, by the user equipment, the channel quality information to the base station according to the resource blocks allocated by the base station.

Correspondingly, an embodiment of the present invention provides a user equipment, including:

a receiving unit, adapted to, when channel quality information of Y downlink carriers is needed to be fed back by the user equipment to a base station through X uplink carriers, receive a control signaling for uplink scheduling UL-grant and obtain the number of resource blocks allocated by the base station to the user equipment according to the number of bits of the channel quality information and a set of resource block numbers that corresponds to a configuration X/Y, where X and Y are positive integers greater than or equal to 1; and a transmission unit, adapted to transmit the channel quality information to the base station according to the resource blocks allocated by the base station.

It can be seen from the above technical solutions provided by the present invention that, the base station may allocate the resource blocks to the user equipment according to the number of bits of the channel quality information and the set of resource block numbers, which allows for adaptive allocation of uplink scheduling bandwidth, and thus resolve the drawback of failing to satisfy transmission performance of the channel quality information by the user equipment due to fixed bandwidth resources.

BRIEF DESCRIPTION OF DRAWING

To illustrate the technical solutions according to the embodiments of the present invention more clearly, the accompanying drawings for describing the embodiments are introduced briefly in the following. It should be noted that the accompanying drawings in the following description are only some embodiments of the present invention, and persons of ordinary skill in the art may derive other drawings from the accompanying drawings without creative efforts.

FIG. 3 is a schematic diagram 2 of a base station according to an embodiment of the present invention;

FIG. 4 is a schematic flowchart of a method for transmitting channel quality information according to an embodiment of the present invention;

DESCRIPTION OF EMBODIMENTS

The technical solutions of the embodiments of the present invention are hereinafter described in detail with reference to the accompanying drawings. It should be noted that the described embodiments are only some exemplary embodiments of the present invention, rather than all embodiments of the present invention. All other embodiments, which can be derived by persons of ordinary skill in the art from the embodiments given herein without making any creative effort, shall fall within the protection scope of the present invention.

Figure 1:
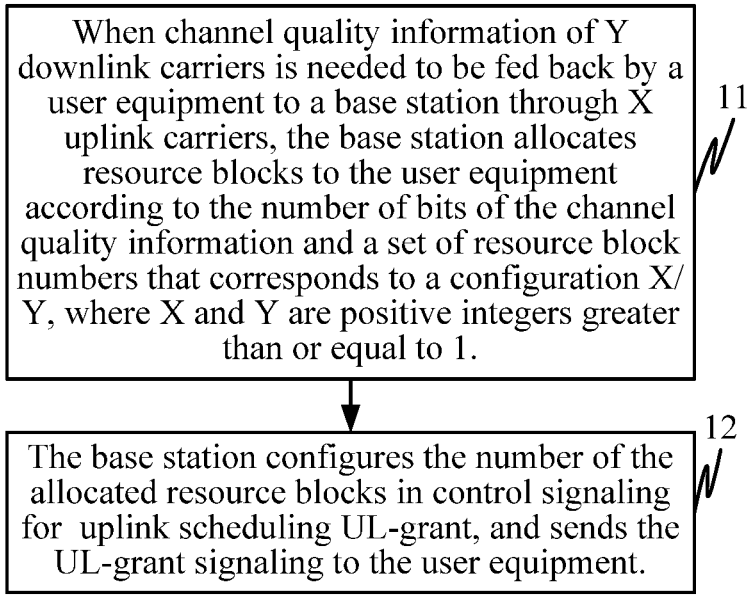
FIG. 1 is a schematic flowchart of a method for transmitting channel quality information according to an embodiment of the present invention.

As shown in FIG. 1, an embodiment of the present invention provides a method for transmitting channel quality information. The method includes:

Step 11: When channel quality information of Y downlink carriers is needed to be fed back by a user equipment to a base station through X uplink carriers, the base station allocates resource blocks to the user equipment according to the number of bits of the channel quality information and a set of resource block numbers that corresponds to a configuration X/Y, in which X and Y are positive integers greater than or equal to 1.

Step 12: The base station configures the number of the allocated resource blocks in a control signaling for uplink scheduling UL-grant, and sends the UL-grant signaling to the user equipment.

In the embodiment of the present invention, a subject performing the method for transmitting the channel quality information may be a base station in an LTE system. The channel quality information may include a CQI, a PMI and an RI. The channel quality information is also referred to as UCI.

The base station may allocate the number of PRBs for the UCI according to the number of the bits of the UCI, while ensuring a certain transmission accuracy rate, which is not described herein.

Optionally, after step 12, only the channel quality information is transmitted by the user equipment on an uplink shared channel, or the channel quality information may be transmitted on the uplink shared channel by being multiplexed with uplink shared channel (UL-SCH) data.

It can be seen from the above technical solution provided by the embodiment of the present invention that, the base station can allocate the resource blocks to the user equipment according to the number of the bits of the channel quality information and the set of resource block numbers. As a result, uplink scheduling bandwidth can be adaptively allocated for transmitting the channel quality information. In addition, the drawback that the transmission performance cannot be guaranteed due to the fixed bandwidth resources through which the user equipment transmits the channel quality information can be resolved.

In the method for transmitting the channel quality information according to the embodiment of the present invention, the allocating, by the base station, the resource blocks to the user equipment according to the bits of the channel quality information and the set of resource block numbers that corresponds to the configuration X/Y in step 11 may include:

when the base station requires the user equipment to transmit only the channel quality information on the uplink shared channel, the base station allocates Z resource blocks to the user equipment according to the number of the bits of the channel quality information and the set of resource block numbers that corresponds to the configuration X/Y, in which Z is a positive integer belonging to the set of resource block numbers that corresponds to the configuration X/Y.

The set of resource block numbers that corresponds to the configuration X/Y is stored in an information table of the base station. The information table may include:

a set of resource block numbers that corresponds to a configuration 1/1 in a situation in which X=1 and Y=1. The set of resource block numbers that corresponds to the configuration 1/1 includes N different resource block numbers which can be allocated for M different bit numbers for the channel quality information of one downlink carrier in a situation in which the user equipment needs to feed back the channel quality information of one downlink carrier through one uplink carrier and where the channel quality information of the one downlink carrier have the M different bit numbers, in which M and N are positive integers greater than or equal to 1; or includes a positive integer less than or equal to a first maximum value, in which the first maximum value is the maximum number among the N different resource block numbers; and a set of the numbers of the resource blocks that corresponds to a configuration X/Y in a situation in which X≠1 or Y≠1. The set of resource block numbers that corresponds to the configuration X/Y includes: L different resource block numbers that are obtained according to the N different resource block numbers and the configuration X/Y, in which L is a positive integer greater than 1; or a positive integer less than or equal to a second maximum value which is the maximum number among the L different resource block numbers.

As an example, for a situation in which X=1 and Y=1, thus the configuration is 1/1, that is, the UCI of one downlink carrier is fed back through one uplink carrier, and where the UCI is of different number of bits such as 10 bits, 20 bits, 30 bits or 40 bits, the numbers of physical resource blocks (PRBs) allocated by the base station that correspond to the different number of bits of the UCI may be, for example, 1, 2, 3, and 4. A set that is formed by [1, 2, 3, 4] may be referred as a set of resource block numbers C1. In addition, the first maximum value among the different numbers of the PRBs, such as 1, 2, 3, or 4, that are allocated by the base station for the different number of bits of the UCI is 4. In this case, a set formed by positive integers less than or equal to 4 may be the set of resource block numbers C1.

In a situation in which X=1, Y=N, and the configuration is 1/N, that is, the UCI of N downlink carriers is fed back through one uplink carrier, and where the number of the PRBs allocated by the base station for the UCI may be, for example, N, 2*N, 3*N, or 4*N. In this case, a set that is formed by [N, 2*N, 3*N, 4*N] may be referred as a set of resource block numbers CN. The second maximum value among the different numbers of the PRBs, such as N, 2*N, 3*N, and 4*N, allocated by the base station for the UCI with respect to the different number of bits is 4*N. In this case, a set formed by positive integers less than or equal to 4*N may be the set of resource block numbers CN.

Then, C1, C2, ..., CN form a set [C1, C2 ... CN], and the set [C1, C2 ... CN] may be stored in the information table. It can be seen that, the information table not only includes configuration of the number of the PRBs in one-carrier case, but also includes configuration of the number of the PRBs in a multi-carrier case where the bits of the UCI are significantly increased.

In addition, from the perspective of the UE, optionally, the UE may obtain the information table [C1, C2 ... CN] through configuration of high layer signaling or dynamic signaling. The UE may implicitly derive the set [C1, C2 ... CN] according to the number of the carriers or other conditions.

Optionally, step 12 in the method for transmitting the channel quality information according to the embodiment of the present invention may include:

the base station configures the UL-grant signaling to indicate a modulation and coding scheme that corresponds to a retransmitted data packet, a channel quality information triggering request and the number of the allocated resource blocks, and sends the UL-grant signaling to the user equipment, so that the user equipment transmits only the channel quality information to the base station on the uplink shared channel according to the resource blocks allocated by the base station.

As an example, multiple fields of the UL-grant signaling are configured on the basis of the 3GPP_Rel-8 standard. For example, $I_{MCS}=29$, $I_{NCS}=30$, or $I_{MCS}=31$ is configured in the UL-grant signaling to indicate that an index of a modulation and coding scheme is 29, 30 or 31. The index 29, 30 or 31 only indicates the modulation and coding scheme that corresponds to a retransmitted data packet, which means that the modulation and coding scheme is the modulation and coding scheme corresponding to the retransmitted uplink data. The MCS refers to modulation and coding scheme. CQI-request=1 is configured in the UL-grant signaling to indicate a CQI triggering request, which means that the base station requires the UE to feed back the downlink channel quality information. $N_{PRB}=n\_PRB\_UCI$ ($n\_PRB\_UCI \in N\_PRB\_UCI$) is configured in the UL-grant signaling. $N\_PRB\_UCI$ denotes the set [C1, C2 ... CN] formed by the sets of the numbers of the PRBs, $n\_PRB\_UCI$ denotes one of the sets C1, C2, ..., CN, such as CN, and $N_{PRB}$ denotes the number of the PRBs allocated by the base station, such as a value in the set CN. Multiple fields of the UL-grant signaling are configured, so as to jointly indicate that no UL-SCH data is transmitted on a physical uplink shared channel (PUSCH), and that only the downlink channel quality information is transmitted on the PUSCH by the UE according to the resource blocks allocated by the base station.

According to the 3GPP_Rel-8 standard, $I_{MCS}=29$, $I_{MCS}=30$, or $I_{MCS}=31$ is used to indicate that the index of the modulation and coding scheme is 29, 30, or 31. The index 29, 30, or 31 indicates the corresponding modulation and coding scheme only valid for a retransmitted data packet and is different from indexes 0-28, which is not described in detail herein.

In addition, the UL-grant signaling may support transmission of one transport block (TB), and may also support transmission of two TBs.

As such, specifically, in above step 12, the base station configures the UL-grant signaling to indicate the modulation and coding scheme that corresponds to the retransmitted data packet may include:

if the UL-grant signaling supports transmission of one transport block, the base station configures a bit field (for example, the modulation and coding scheme bit field $I_{MCS}$) corresponding to the transport block in the UL-grant signaling to indicate the modulation and coding scheme corresponding to the retransmitted data packet, for example, $I_{MCS}=29$;

alternatively, if the UL-grant signaling supports transmission of two transport blocks, the base station configures bit fields corresponding to the two transport blocks in the UL-grant signaling to indicate the modulation and coding scheme corresponding to the retransmitted data packet, for example, $I_{MCS}=29$;

alternatively, if the UL-grant signaling supports transmission of two transport blocks, the base station configures a bit field corresponding to one of the two transport blocks in the UL-grant signaling to indicate the modulation and coding scheme corresponding to the retransmitted data packet, for example, $I_{MCS}=29$.

It can be seen that, the UL-grant signaling is configured, on the basis of the 3GPP_Rel-8 standard, to instruct the user equipment to transmit the UCI on the PUSCH according to the PRBs allocated by the base station, so as to keep backward compatibility with the 3GPP_Rel-8 standard. In addition, the problem that resources are restricted or UCI transmission performance is decreased when the number of the bits of the UCI information exceeds a certain limitation is resolved without introducing complexity.

Optionally, step 12 in the method for transmitting the channel quality information according to the embodiment of the present invention may include the followings:

The base station configures a bit field corresponding to at least one transport block in the UL-grant signaling to indicate that the corresponding transport block is disabled (for example, a combination of two or more fields in the UL-grant is used as the bit field; for example, the combination of a modulation and coding scheme corresponding to a retransmitted data packet and a new data indicator indicating an initial transmission data packet or the combination of the modulation and coding scheme corresponding to an initial transmission data packet and a new data indicator indicating a retransmitted data packet), and configures the UL-grant signaling to indicate a channel quality information triggering request and the number of allocated resource blocks, and sends the UL-grant signaling to the user equipment, so that the user equipment transmits only the channel quality information to the base station on the uplink shared channel according to the resource blocks allocated by the base station. It should be noted that, even if the number of the allocated resource blocks does not belong to the set of resource block numbers that corresponds to the configuration X/Y, the base station can trigger the user equipment to transmit only the channel quality information to the base station on the uplink shared channel according to the resource blocks allocated by the base station, by configuring the bit field corresponding to the at least one transport block in the UL-grant signaling to indicate that the corresponding transport block is disabled and the channel quality information triggering request.

Specifically, if the UL-grant signaling supports transmission of one TB, the base station configures a bit field corresponding to the TB in the UL-grant signaling to indicate that the TB is disabled, and configures the UL-grant signaling to indicate a channel quality information triggering request and the number of the resource blocks allocated by the base station, so that the user equipment can transmits only the channel quality information to the base station on the uplink shared channel according to the number of the resource blocks allocated by the base station.

Alternatively, if the UL-grant signaling supports transmission of two TBs, the base station configures a bit field corresponding to one of the two TBs in the UL-grant signaling to indicate that the corresponding TB is disabled, and configures the UL-grant signaling to indicate a channel quality information triggering request and the number of the resource blocks allocated by the base station, so that the user equipment transmits only the channel quality information to the base station on the uplink shared channel according to the number of the resource blocks allocated by the base station.

Alternatively, if the UL-grant signaling supports transmission of two transport blocks, the base station configures bit fields corresponding to the two TBs in the UL-grant signaling to indicate that the two TBs are both disabled, and configures the UL-grant signaling to indicate a channel quality information triggering request and the number of resource blocks allocated by the base station, so that the user equipment transmits only the channel quality information to the base station on the uplink shared channel according to the number of the resource blocks allocated by the base station.

It can be seen that, the combination of the disabling of a TB and CQI-request=1 can be used to trigger the user equipment to transmit only the channel quality information to the base station on the uplink shared channel. Furthermore, with the number of the PRBs allocated by the base station, the user equipment can transmits only the channel quality information to the base station on the uplink shared channel through the resource blocks allocated by the base station.

In addition, there is no limitation about which specific fields of the UL-grant signaling, as long as multiple fields of the UL-grant signaling are configured to trigger the user equipment to transmit only the channel quality information on the uplink shared channel to the base station, the user equipment can transmits the channel quality information to the base station on the uplink shared channel according to the resource blocks allocated by the base station.

For example, the "Precoding information" field of the UL-grant signaling may indicate a precoding vector for transmitting the UCI. Then, it can be implicitly known whether the UCI is transmitted on one code word (CW) or two CWs, and a rank value of a channel matrix. Therefore, the "Precoding information" field may be configured, together with other fields of the UL-grant signaling, to trigger the user equipment to transmit only the channel quality information to the base station on the uplink shared channel.

Optionally, step 12 in the method for transmitting the channel quality information according to the embodiment of the present invention may include:

the base station configures the UL-grant signaling to indicate a modulation and coding scheme corresponding to a retransmitted data packet, configures a new data indicator in the UL-grant signaling to indicate an initial transmission data packet, configures the UL-grant signaling to indicate a channel quality information triggering request and the number of the resource blocks allocated by the base station, so that the user equipment can transmits only the channel quality information to the base station on the uplink shared channel according to the resource blocks allocated by the base station. It should be noted that, even if the number of the allocated resource blocks does not belong to the set of resource block numbers that corresponds to the configuration X/Y, the base station can trigger the user equipment to transmit only the channel quality information to the base station on the uplink shared channel according to the resource blocks allocated by the base station by merely configuring the UL-grant signaling to indicate a modulation and coding scheme corresponding to a retransmitted data packet, the new data indicator to indicate the initial transmission data packet, and the channel quality information triggering request.

In an example, multiple fields in the UL-grant signaling are configured, such as $I_{MCS}=29$, NDI (New Data Indicator, new data indicator) indicating an initial transmission data packet, CQI-request=1, and $N_{PRB}=n\_{PRB\_UCI}$ ($n\_{PRB\_UCI} \in N\_{PRB\_UCI}$) are configured in the UL-grant signaling. $I_{MCS}=29$ indicates that an index of the modulation and coding scheme is 29. The index 29 indicates the modulation and coding scheme corresponding to a retransmitted data packet. For NDI, specifically, whether the NDI indicates the initial transmission data packet is determined according to whether the NDI is toggled (in a toggled state). The toggled state means that a state of the NDI is different from a state last time. If the NDI is 1 last time, after the toggle, the NDI should be 0 this time; if the NDI is 0 last time, after the toggle, the NDI should be 1 this time. Otherwise, the NDI is not toggled, which indicates not an initial transmitted data packet but indicates a retransmitted data packet. The CQI-request=1 is used to indicate a CQI triggering request, which means that the base station requires the UE to feed back the channel quality information. $N_{PRB}=n\_{PRB\_UCI}$ ($n\_{PRB\_UCI} \in N\_{PRB\_UCI}$) in the UL-grant signaling indicates the number of the PRBs allocated by the base station.

As such, $I_{MCS}=29$ indicates a retransmitted data packet, a toggled NDI, however, indicates an initial transmission data packet, which result in chaotic indication of the UL-grant signaling. Therefore, the UL-SCH data cannot be transmitted on the PUSCH. Further according to CQI-request=1 and the number of the PRBs allocated by the base station, the user equipment may transmit only the channel quality information on the PUSCH.

Likewise, $I_{MCS}=30$ and $I_{MCS}=31$ are also applicable to the method for transmitting the channel quality information according to the embodiment of the present invention, which are not described in detail herein again.

Alternatively, step 12 may include: the base station configures the UL-grant signaling to indicate a modulation and coding scheme corresponding to an initial transmission data packet, configures a new data indicator in the UL-grant signaling to indicate a retransmitted data packet, configures the UL-grant signaling to indicate a channel quality information triggering request, and the number of the resource blocks allocated by the base station, so that the user equipment can transmits only the channel quality information on the uplink shared channel to the base station according to the resource blocks allocated by the base station. It should be noted that, even if the number of the allocated resource blocks does not belong to the set of resource block numbers corresponding to the configuration X/Y, the base station can trigger the user equipment to transmit only the channel quality information on the uplink shared channel to the base station according to the resource blocks allocated by the base station by merely configuring the UL-grant signaling to indicate a modulation and coding scheme corresponding to an initial transmission data packet, a new data indicator indicating a retransmitted data packet, and a channel quality information triggering request.

As an example, multiple fields of the UL-grant signaling, such as $I_{MCS}=0$, non-toggled NDI, CQI-request=1, and $N_{PRB}=n\_{PRB\_UCI}$ ($n\_{PRB\_UCI} \in N\_{PRB\_UCI}$), are configured in the UL-grant signaling. $I_{MCS}=0$ indicates that an index of a modulation and coding scheme is 0. The index 0 indicates the modulation and coding scheme corresponding to an initial transmission data packet. That is, the $I_{MCS}=0$ indicates the modulation and coding scheme corresponding to the initial transmission of data packet. The non-toggled NDI indicates a retransmitted data packet. The CQI-request=1 indicates a CQI triggering request, which means that the base station requires the UE to feed back the channel quality information. $N_{PRB}=n\_{PRB\_UCI}$ ($n\_{PRB\_UCI} \in N\_{PRB\_UCI}$) indicates the number of the PRBs allocated by the base station.

As such, $I_{MCS}=0$ indicates an initial transmission data packet, the non-toggled NDI, however, indicates a retransmitted data packet, which result in chaotic indications of the UL-grant signaling. Therefore no UL-SCH data is transmitted on the PUSCH. Further according to CQI-request=1 and the number of the PRBs allocated by the base station, the user equipment may transmit only the channel quality information through the PUSCH.

In addition, the UL-grant signaling may support transmission of one TB, and may also support transmission of two TBs. As such, the base station configures the UL-grant signaling to indicate the modulation and coding scheme corresponding to the retransmitted data packet in above step 12 may include:

If the UL-grant signaling supports transmission of one transport block, the base station configures an indicator bit corresponding to the transport block in the UL-grant signaling to indicate the modulation and coding scheme corresponding to the retransmitted data packet, and the new data indicator in the UL-grant signaling to indicate the initial transmission data packet. Alternatively, the base station configures the indicator bit corresponding to the transport block in the UL-grant signaling to indicate the modulation and coding scheme corresponding to the initial transmission data packet, and the new data indicator to indicate the retransmitted data packet.

Alternatively, if the UL-grant signaling supports transmission of two transport blocks, the base station configures the bit fields corresponding to both the two transport blocks in the UL-grant signaling to indicate the modulation and coding scheme corresponding to the retransmitted data packet, and the new data indicator to indicate the initial transmission data packet. Alternatively, the base station configures the bit fields corresponding to both the two transport blocks in the UL-grant signaling to indicate the modulation and coding scheme corresponding to the initial transmission data packet, and the new data indicator to indicate the retransmitted data packet.

Alternatively, if the UL-grant signaling supports transmission of two transport blocks, the base station configures an indicator bit corresponding to one of the two transport blocks in the UL-grant signaling to indicate the modulation and coding scheme corresponding to the retransmitted data packet, and the new data indicator to indicate the initial transmission data packet; or the base station configures the indicator bit corresponding to one of the two transport blocks in the UL-grant signaling to indicate the modulation and coding scheme corresponding to the initial transmission data packet, and the new data indicator to indicate the retransmitted data packet.

It can be seen that, by configuring the multiple fields of the UL-grant signaling, the user equipment is triggered to transmit only the channel quality information to the base station on the uplink shared channel according to the resource blocks allocated by the base station.

Figure 2:
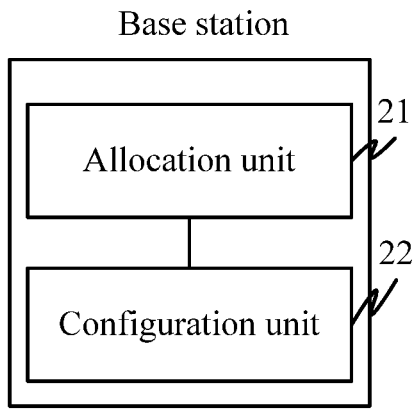
FIG. 2 is a schematic diagram 1 of a base station according to an embodiment of the present invention.

As shown in FIG. 2, corresponding to the method for transmitting the channel quality information in the above embodiment, an embodiment of the present invention provides a base station The base station includes:

an allocation unit 21, adapted to, when channel quality information of Y downlink carriers is needed to be fed back by a user equipment to a base station through X uplink carriers, allocate resource blocks to the user equipment according to the number of bits of the channel quality information and a set of resource block numbers that corresponds to a configuration X/Y, in which X and Y are positive integers greater than or equal to 1; and a configuration unit 22, adapted to configure the number of the allocated resource blocks in a control signaling for uplink scheduling UL-grant, and send the signaling to the user equipment.

In the embodiment of the present invention, the channel quality information may include a CQI, a PMI and an RI. The channel quality information may be referred to as UCI.

As shown in FIG. 3, the base station of the embodiment of the present invention may further include:

a first storage unit 31, adapted to store the set of resource block numbers that corresponds to the configuration X/Y. In a situation in which the base station requires the user equipment to transmit only the channel quality information on the uplink shared channel, Z resource blocks is allocated by the base station to the user equipment according to the number of the bits of the channel quality information and the stored set of resource block numbers that corresponds to the configuration X/Y, in which Z is a positive integer belonging to the set of resource block numbers that corresponds to the configuration X/Y.

The set of resource block numbers that corresponds to the configuration X/Y is stored in an information table at the base station. The information table may include:

a set of resource block numbers that corresponds to a configuration 1/1 in a situation in which X=1 and Y=1. The set of resource block numbers that corresponds to the configuration 1/1 includes N different resource block numbers that can be allocated to M different bit numbers for the channel quality information of one downlink carrier in a situation in which the user equipment needs to feed back the channel quality information of one downlink carrier through one uplink carrier and where the channel quality information of the downlink carrier have the M different bit numbers, in which M and N are positive integers greater than or equal to 1; or includes a positive integer less than or equal to a first maximum value which, is a maximum value among the N different resource block numbers; and a set of resource block numbers corresponding to a configuration X/Y in a situation in which X≠1 or Y≠1. The set of resource block numbers that corresponds to the configuration X/Y includes: L different resource block numbers that are obtained according to the N different resource block numbers and the configuration X/Y, in which L is a positive integer greater than 1; or a positive integer less than or equal to a second maximum, which is the maximum one among the L different resource block numbers.

Specifically, the details about the information table and the set of resource block numbers that corresponds to the configuration X/Y can be referred back to the embodiment shown in FIG. 1, and are not described in detail herein again.

Optionally, the configuration unit 22 of the base station in the embodiment of the present invention may include:

a first configuration unit 221, adapted to configure the UL-grant signaling to indicate a modulation and coding scheme corresponding to a retransmitted data packet, a channel quality information triggering request and the number of the allocated resource blocks; and send the UL-grant signaling to the user equipment so that the user equipment transmits only the channel quality information to the base station on the uplink shared channel according to the resource blocks allocated by the base station.

Specifically, the first configuration unit 221 may include:

a first configuration sub-unit, adapted to set, if the UL-grant signaling supports transmission of one transport block, a bit field corresponding to the transport block in the UL-grant signaling to indicate the modulation and coding scheme corresponding to the retransmitted data packet; and a second configuration sub-unit, adapted to configure, if the UL-grant signaling supports transmission of two transport blocks, bit fields corresponding to the two transport blocks in the UL-grant signaling to indicate the modulation and coding scheme corresponding to the retransmitted data packet; or to configure, if the UL-grant signaling supports transmission of two transport blocks, a bit field corresponding to one of the two transport blocks in the UL-grant signaling to indicate the modulation and coding scheme corresponding to the retransmitted data packet.

Specifically, reference may be made to the same content in the embodiment shown in FIG. 1 to understand the first configuration unit 221, and details are not described herein again.

It can be seen that, the UL-grant signaling is configured, on the basis of the 3GPP_Rel-8 standard, to instruct the user equipment to transmit the UCI on the PUSCH according to the number of the PRBs allocated by the base station, so as to keep backward compatibility with the 3GPP_Rel-8 standard. Furthermore, the problem that the resources are limited or the UCI transmission performance is decreased when the bit size of the UCI information exceeds a certain limitation is resolved without introducing complexity.

Optionally, the configuration unit 22 of the base station in the embodiment of the present invention may include:

a second configuration unit 222, adapted to configure a bit field corresponding to at least one transport block in the UL-grant signaling to indicate that the corresponding transport block is disabled, configure the UL-grant signaling to indicate a channel quality information triggering request and the number of the allocated resource blocks, and then send the UL-grant signaling to the user equipment, so that the user equipment solely transmits the channel quality information to the base station on the uplink shared channel according to the resource blocks allocated by the base station.

It can be seen that, there is no limitation on which specific fields of the UL-grant signaling are configured, as long as multiple fields of the UL-grant signaling can be configure to indicate that no data is transmitted on the uplink shared channel. Thus, the user equipment can transmit only the channel quality information to the base station on the uplink shared channel according to the number of the resource blocks allocated by the base station.

Specifically, with respect to the details about the second configurations unit 222, reference may be made to the embodiment shown in FIG. 1, and are not described in detail herein.

Optionally, the configuration unit 22 of the base station in the embodiment of the present invention may include:

a third configuration unit 223, adapted to configure the UL-grant signaling to indicate a modulation and coding scheme corresponding to a retransmitted data packet, configure a new data indicator in the UL-grant to indicate initial transmission data packet, configure the UL-grant signaling to indicate a channel quality information triggering request and the number of the resource blocks allocated by the base station, so that the user equipment transmits only the channel quality information to the base station on the uplink shared channel according to the number of the resource blocks allocated by the base station.

Alternatively, the base station configures the UL-grant signaling to indicate a modulation and coding scheme corresponding to an initial transmission data packet, a new data indicator indicating a retransmitted data packet, channel quality information triggering request and the number of the resource blocks allocated by the base station, so that the user equipment solely transmits the channel quality information to the base station on the uplink shared channel according to the number of the resource blocks allocated by the base station.

Specifically, the third configuration unit 223 may include:

a third configuration sub-unit, adapted to configure, if the UL-grant signaling supports transmission of one transport block, a bit field corresponding to the transport block in the UL-grant signaling to indicate the modulation and coding scheme corresponding to the retransmitted data packet, and the new data indicator to indicate an initial transmission data packet; or configure a bit field corresponding to the transport block in the UL-grant signaling to indicate the modulation and coding scheme corresponding to the initial transmission data packet, and the new data indicator to indicate the retransmitted data packet; and a fourth configuration sub-unit, adapted to configure, if the UL-grant signaling supports transmission of two transport blocks, bit fields corresponding to the two transport blocks in the UL-grant signaling to indicate the modulation and coding scheme corresponding to the retransmitted data packet, and the new data indicator to indicate the initial transmission data packet, or adapted to configure bit fields corresponding to the two transport blocks in the UL-grant signaling to indicate the modulation and coding scheme corresponding to the initial transmission data packet, and the new data indicator to indicate the retransmitted data packet. Alternatively, if the UL-grant signaling supports transmission of two transport blocks, the fourth configuration sub-unit is adapted to configure a bit field corresponding to one of the two transport blocks in the UL-grant signaling to indicate the modulation and coding scheme corresponding to a retransmitted data packet, and the new data indicator to indicate an initial transmission data packet, or adapted to configure the bit field corresponding to the one of the two transport blocks in the UL-grant signaling to indicate the modulation and coding scheme corresponding to the initial transmission data packet, and the new data indicator to indicate the retransmitted data packet.

Specifically, the third configuration unit 223 can be understood by referring to the embodiment shown in FIG. 1, and is not described herein again.

It can be seen from the above technical solutions provided by the embodiment of present invention that, the base station can allocate the resource blocks to the user equipment according to the number of the bits of the channel quality information and the set of resource block numbers. As a result, uplink scheduling bandwidth can be more adaptively allocated for the transmission of the channel quality information. In addition, the drawback that the transmission performance cannot be guaranteed due to the fixed bandwidth resources through which the user equipment transmits the channel quality information.

As shown in FIG. 4, an embodiment of the present invention provides a method for transmitting channel quality information. The method includes the following steps.

Step 41: A base station configures a bit field corresponding to at least one transport block in UL-grant signaling to indicate that the corresponding transport block is disabled, and configures the UL-grant signaling to indicate a channel quality information triggering request and the number of allocated resource blocks.

Step 42: The base station sends the UL-grant signaling to user equipment, so that the user equipment can transmit only the channel quality information to the base station on an uplink shared channel according to the resource blocks allocated by the base station.

Specifically, with respect to the detail of triggering the channel quality information transmission, it can be referred to the embodiment shown in FIG. 1, and are not described in detail herein again.

It can be seen that, the disabling of a TB is disabled and CQI-request=1 can be used to trigger the user equipment to transmit only the channel quality information to the base station on the uplink shared channel. Furthermore, with the number of the resource blocks allocated by the base station to the user equipment, the user equipment can transmit the channel quality information to the base station on the uplink shared channel according to the resource blocks allocated by the base station.

Meanwhile, there is no limitation about which specific fields of the UL-grant signaling are configured, as long as multiple fields of the UL-grant signaling are configured to trigger the user equipment to transmit only the channel quality information to the base station on the uplink shared channel. Further, the user equipment transmits only the channel quality information to the base station on the uplink shared channel according to the resource blocks allocated by the base station.

For example, the "Precoding information" field of the UL-grant signaling may indicate a precoding vector for transmitting the UCI. It can be implicitly known whether the UCI is transmitted on one CW or two CWs, and a rank of a channel matrix. Therefore, the "Precoding information" field may be configured, together with other fields of the UL-grant signaling, to triggers the user equipment to transmit only the channel quality information to the base station on the uplink shared channel.

It can be seen from the above technical solution provided by the embodiment of present invention that, the base station may allocate the resource blocks to the user equipment according to the bits of the channel quality information and the set of resource block numbers. As a result, uplink scheduling bandwidth can be more flexibly allocated for the transmission of the channel quality information. In addition, the drawback that the transmission performance cannot be guaranteed due to the fixed bandwidth resources through which the user equipment transmits the channel quality information.

Figure 5:
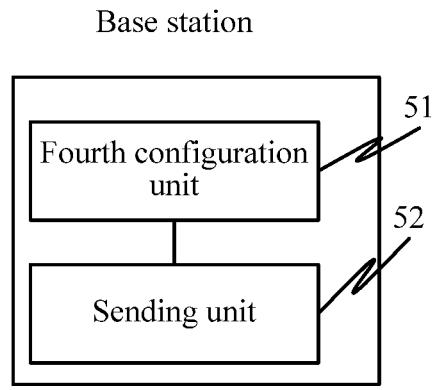
FIG. 5 is a schematic diagram of a base station according to an embodiment of the present invention.

As shown in FIG. 5, corresponding to the method for transmitting the channel quality information in the above embodiment, an embodiment of the present invention provides a base station, including:

a fourth configuration unit 51, adapted to configure a bit field corresponding to at least one transport block in UL-grant signaling to indicate that the corresponding transport block is disabled, and configure the UL-grant signaling to include a channel quality information triggering request and the number of allocated resource blocks; and a sending unit 52, adapted to send the UL-grant signaling to a user equipment, so that the user equipment transmits only the channel quality information to the base station on an uplink shared channel according to the resource blocks allocated by the base station.

Specifically, the base station according to the embodiment of the present invention may be referred to the corresponding description in the embodiment shown in FIG. 1, and is not described in detail herein again.

It can be seen that, on the basis that a TB is disabled and CQI-request=1, the user equipment may be triggered to transmit only the channel quality information to the base station on the uplink shared channel. Furthermore, with the number of the resource blocks allocated by the base station to the user equipment, the user equipment can transmit the channel quality information to the base station on the uplink shared channel according to the resource blocks allocated by the base station.

It can be seen from the above technical solution provided by the embodiment of present invention that, the base station may allocate the resource blocks to the user equipment according to the bits of the channel quality information and the set of resource block numbers. As such, uplink scheduling bandwidth can be flexibly allocated for the transmission of the channel quality information. In addition, the drawback that the transmission performance cannot be guaranteed due to the fixed bandwidth resources through which the user equipment transmits the channel quality information can be resolved.

Figure 6:
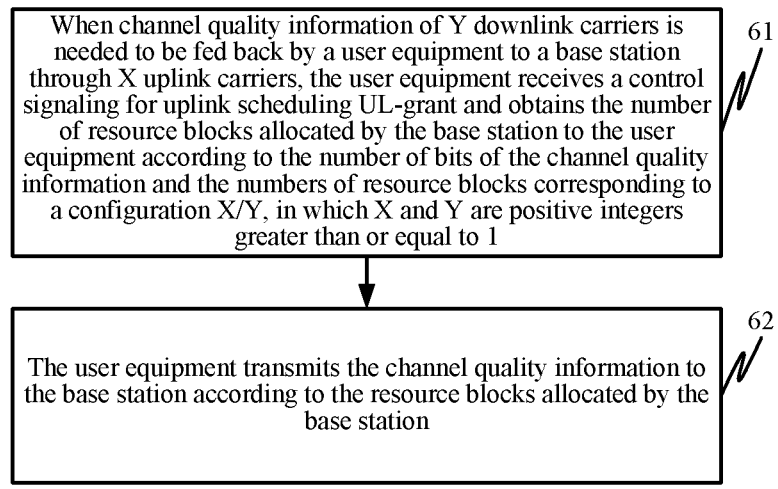
FIG. 6 is a schematic diagram of a method for transmitting channel quality information according to an embodiment of the present invention.

As shown in FIG. 6, an embodiment of the present invention provides a method for transmitting channel quality information. The method includes the following steps.

Step 61: When channel quality information of Y downlink carriers is needed to be fed back by a user equipment to a base station through X uplink carriers, the user equipment receives a control signaling for uplink scheduling UL-grant and obtains the number of resource blocks allocated by the base station to the user equipment according to the number of bits of the channel quality information and the numbers of resource blocks corresponding to a configuration X/Y, in which X and Y are positive integers greater than or equal to 1.

Step 62: The user equipment transmits the channel quality information to the base station according to the resource blocks allocated by the base station.

In the method for transmitting the channel quality information according to the embodiment of the present invention, the base station may be a base station in an LTE system. The user equipment needs to transmit the channel quality information of a downlink carrier to the base station. The channel quality information may include a CQI, a PMI and an RI, and is also referred to as UCI.

The method for transmitting the channel quality information according to the embodiment of the present invention may further include the following step:

The user equipment obtains a set of resource block numbers that corresponds to the configuration X/Y from the base station through higher layer signaling or dynamic signaling. Alternatively, the user equipment may implicitly derive the set of resource block numbers according to the configuration X/Y.

It can be seen that, the user equipment may obtain the set of resource block numbers that corresponds to the configuration X/Y from the base station through higher layer signaling or dynamic signaling; or the UE may know the configure [C1, C2, . . . CN] of the numbers of the resource blocks by implicitly deriving according to the configuration X/Y.

The set of resource block numbers that corresponds to the configuration X/Y may be stored in an information table. The information table may include:

a set of resource block numbers that corresponds that corresponds to configuration 1/1 in a situation in which X=1 and Y=1. The set of resource block numbers that corresponds to the configuration 1/1 includes: N different resource block numbers allocated to M different bit numbers of the channel quality information of one downlink carrier in a situation in which the user equipment needs to feed back the channel quality information of one downlink carrier through one uplink carrier and where the channel quality information of one downlink carrier have the M different bit numbers, in which M and N are positive integers greater than or equal to 1; or includes a positive integer less than or equal to a first maximum which is the maximum value among the N different numbers of the resource blocks; and a set of resource block numbers that corresponds to a configuration X/Y in a situation in which X≠1 or Y≠1. The set of resource block numbers that corresponds to the configuration X/Y includes: L different resource block numbers that are obtained according to the N different resource block numbers and the configuration X/Y, where L is a positive integer greater than 1; or a positive integer less than or equal to a second maximum value which is the maximum number among the L different resource block numbers.

In order to understand the information table and the set of resource block numbers that corresponds to the configuration X/Y in this embodiment, reference may be made to the embodiment shown in FIG. 1, and no details are not described herein again.

Optionally, step 61 in the method for transmitting the channel quality information according to the embodiment of the present invention may include:

The user equipment receives a control signaling for uplink scheduling UL-grant which indicates a modulation and coding scheme corresponding to a retransmitted data packet and a channel quality information triggering request and the number of the allocated resource blocks.

In such case, the user equipment determines whether the number of the allocated resource blocks belongs to the set of resource block numbers that corresponds to the configuration X/Y. If it is determined that the number of the allocated resource blocks belongs to the set of resource block numbers that corresponds to the configuration X/Y, the user equipment transmits only the channel quality information to the base station on an uplink shared channel according to the resource blocks allocated by the base station.

On the contrary, when it is determined that the number of the allocated resource blocks belongs to the set of resource block numbers that corresponds to the configuration X/Y, the user equipment may transmit the channel quality information together with UL-SCH data on the uplink shared channel by multiplexing the channel quality information and UL-SCH data on the uplink shared channel.

Specifically, the UL-grant signaling in this embodiment may be referred to the relevant description of the UL-grant signaling described above in the embodiment shown in FIG. 1, is not described in detail herein.

It can be seen that, the user equipment may transmit only the channel quality information on the uplink shared channel, or transmit the channel quality information and UL-SCH data on the uplink shared channel by multiplexing them on the uplink shared channel.

Optionally, step 61 in the method for transmitting the channel quality information according to the embodiment of the present invention may include:

The user equipment receives a control signaling for uplink scheduling UL-grant in which a bit field corresponding to at least one transport block indicates that the corresponding transport block is disabled. The received control signaling for uplink scheduling UL-grant indicates a channel quality information triggering request and the number of the allocated resource blocks are included.

In such case, the user equipment transmits only the channel quality information to the base station on the uplink shared channel according to the number of the resource blocks allocated by the base station.

Specifically, if the UL-grant signaling supports transmission of one TB, the UL-grant signaling received by the user equipment is configured by the base to make a bit field corresponding to the TB to indicate that the corresponding TB is disabled, and the UL-grant signaling is configure to indicate a channel quality information triggering request and the number of the resource blocks allocated by the base station, so that the user equipment transmits only the channel quality information to the base station on the uplink shared channel according to the number of the resource blocks allocated by the base station.

Alternatively, if the UL-grant signaling supports transmission of two TBs, the UL-grant signaling received by the user equipment is configured by the base station to make a bit field corresponding to one of the two TBs to indicate that the corresponding TB is disabled, and is configured to indicate a channel quality information triggering request and the number of the resource blocks allocated by the base station, so that the user equipment can transmit only the channel quality information to the base station on the uplink shared channel according to the number of the resource blocks allocated by the base station.

Alternatively, if UL-grant signaling supporting transmission of two transmission blocks, the UL-grant signaling received by the user equipment is configured by the base station to make the bit fields corresponding to the two TBs to indicate that both the two TBs are disabled, and the UL-grant signaling is configure to indicate a channel quality information triggering request and the number of the resource blocks allocated by the base station, so that the user equipment can transmit only the channel quality information to the base station on the uplink shared channel according to the number of the resource blocks allocated by the base station.

Specifically, the detail of the UL-grant signaling may be referred to the relevant description of the UL-grant signaling in the embodiment shown in FIG. 1, and is not described herein again.

Optionally, step 61 in the method for transmitting the channel quality information according to the embodiment of the present invention may include:

The user equipment receive a control signaling for uplink scheduling UL-grant which indicates a modulation and coding scheme corresponding to a retransmitted data packet, a new data indicator indicating an initial transmission data packet, and a channel quality information triggering request and the number of the resource blocks allocated by the base station. Alternatively, the received UL-grant signaling indicates a modulation and coding scheme corresponding to an initial transmission data packet, a new data indicator indicating a retransmitted data packet, and a channel quality information triggering request and the number of the resource blocks allocated by the base station.

In such case, the user equipment can transmit only the channel quality information to the base station on the uplink shared channel according to the number of the resource blocks allocated by the base station.

Specifically, for the UL-grant signaling, reference may be made to the relevant description in the embodiment shown in FIG. 1, and details are not described herein again.

It can be seen from the above technical solution provided by the embodiment of present invention that, the base station can allocate the resource blocks to the user equipment according to the number of the bits of the channel quality information and the set of resource block numbers. As a result, uplink scheduling bandwidth can be more flexibly allocated for the transmission of the channel quality information. In addition, the drawback that transmission performance of the channel quality information cannot be guaranteed due to the fixed bandwidth resources through which the user equipment transmits the channel quality information can be resolved.

In the above method for transmitting the channel quality information according to the embodiment of the present invention, step 62 may include:

when the number of the resource blocks allocated by the base station is not enough for the transmission of the channel quality information, the user equipment divides the channel quality information into multiple data packets, and transmits the multiple data packets to the base station through multiple continuous uplink sub-frames.

The manner of dividing the channel quality information into multiple data packets by the user equipment may include:

The channel quality information is evenly divided into, according to the number of bits of the channel quality information, multiple data packets with the same number of bits.

Alternatively, the channel quality information corresponding to different downlink carriers is divided into different data packets.

Alternatively, the channel quality information is divided according to its content to make the channel quality information with the same content is divided into the same data packet. That is, the number of bits of the channel quality information varies based on different content of the channel quality information, and the channel quality information with the same content is divided into the same data packet.

Optionally, in the method for transmitting the channel quality information according to the embodiment of the present invention, the number of the multiple uplink sub-frames through which the user equipment feeds back the channel quality information may be obtained by the user equipment through configuration of higher layer signaling or dynamic signaling.

It can be seen from the technical solution provided by the embodiment of the present invention that, even if the bits of the channel quality information fed back by the user equipment exceed the transmission bandwidth allocated by the base station, the user equipment can divide the channel quality information into multiple data packets, so as to satisfy the transmission performance.

Figure 7:
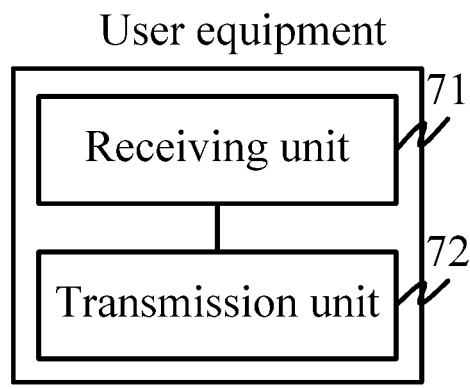
FIG. 7 is a schematic diagram 1 of user equipment according to an embodiment of the present invention.

As shown in FIG. 7, corresponding to the method for transmitting the channel quality information in the above embodiment, an embodiment of the present invention provides a user equipment which includes:

a receiving unit 71, adapted to, when channel quality information of Y downlink carriers is needed to be fed back by a user equipment through X uplink carriers to a base station, receive a control signaling for uplink scheduling UL-grant and obtain the number of resource blocks allocated by the base station to the user equipment according to the number of the bits of the channel quality information and a set of resource block numbers that corresponds to a configuration X/Y, in which X and Y are positive integers greater than or equal to 1; and a transmission unit 72, adapted to transmit the channel quality information to the base station according to the resource blocks allocated by the base station.

The base station may be a base station in an LTE system, and the user equipment needs to transmit the channel quality information corresponding to the downlink carrier to the base station. The channel quality information may include a CQI, a PMI and an RI. The channel quality information is also referred to as UCI.

It can be seen from the above technical solution provided by the embodiment of present invention that, the base station can allocate the resource blocks to the user equipment according to the number of the bits of the channel quality information and the set of resource block numbers. As a result uplink scheduling bandwidth can be flexibly allocated for the transmission of the channel quality information. In addition, the drawback that transmission performance of the channel quality information cannot be guaranteed due to the fixed bandwidth resource through which the user equipment transmits the channel quality information can be resolved.

Figure 8:
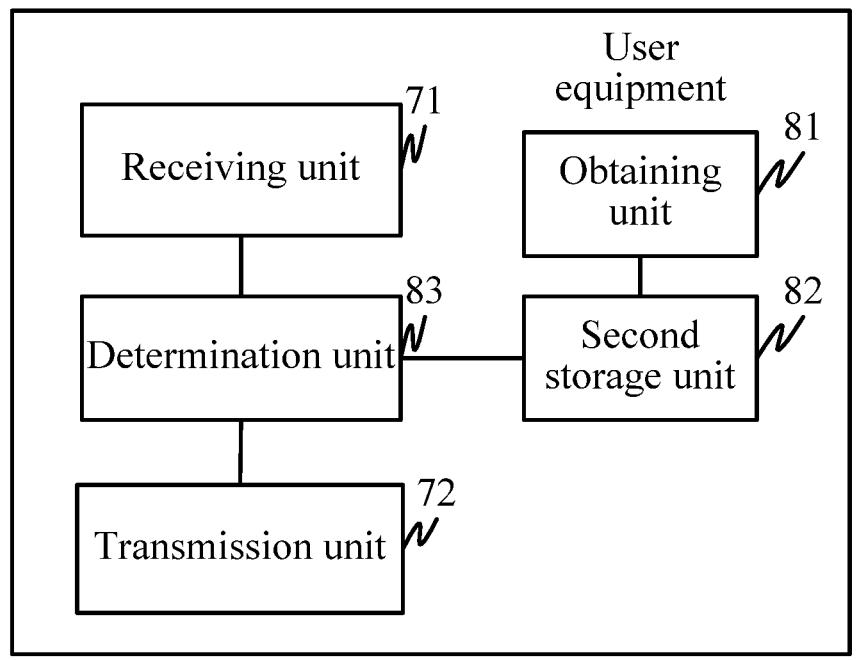
FIG. 8 is a schematic diagram 2 of user equipment according to an embodiment of the present invention.

As shown in FIG. 8, the user equipment of the embodiment of the present invention may further include:

an obtaining unit 81, adapted to obtain the set of resource block numbers that corresponds to the configuration X/Y from the base station through configuration of higher layer signaling or dynamic signaling, or implicitly derive the set of resource block numbers that corresponds to the configuration X/Y according to the configuration X/Y;

a second storage unit 82, adapted to store the set of resource block numbers that corresponds corresponding to the configuration X/Y in an information table; and a determination unit 83, adapted to determine whether the number of the allocated resource blocks belongs to the set of resource block numbers that corresponds to the configuration X/Y.

For the information table and the set of resource block numbers, reference may be made to the embodiment shown in FIG. 1, and are not described in detail herein again.

Optionally, the receiving unit 71 may include:

a first receiving unit, adapted to receive the control signaling for uplink scheduling UL-grant which indicates a modulation and coding scheme corresponding to a retransmitted data packet, a channel quality information triggering request and the number of the allocated resource blocks.

In such case, the determination unit 83 determines whether the number of the allocated resource blocks belongs to the set of resource block numbers that corresponds to the configuration X/Y, and the transmission unit 72 transmits only the channel quality information to the base station on an uplink shared channel according to the resource blocks allocated by the base station.

Specifically, as for the UL-grant signaling, reference may be made to the relevant UL-grant signaling in the embodiment shown in FIG. 1, and details are not described herein again.

Optionally, the receiving unit 71 may include:

a second receiving unit, adapted to receive the control signaling for uplink scheduling UL-grant in which a bit field corresponding to at least one transport block indicates that the corresponding transport block is disabled, and which indicate a channel quality information triggering request and the number of the allocated resource blocks are included.

Specifically, for the UL-grant signaling, reference may be made to the relevant UL-grant signaling in the embodiment shown in FIG. 1, and details are not described herein again.

Optionally, the receiving unit 71 may include:

a third receiving unit, adapted to receive the control signaling for uplink scheduling UL-grant which includes a modulation and coding scheme corresponding to a retransmitted data packet, a new data indicator indicating an initial transmission data packet, a channel quality information triggering request and the number of the resource blocks allocated by the base station. Alternatively, the received UL-grant signaling includes a modulation and coding scheme corresponding to an initial transmission data packet, the new data indicator indicating a retransmitted data packet, the channel quality information triggering request and the number of the resource blocks allocated by the base station.

Specifically, for the UL-grant signaling, reference may be made to the relevant UL-grant signaling in the embodiment shown in FIG. 1, and details are not described herein again.

Optionally, the transmission unit 72 may include:

a dividing sub-unit, adapted to divide, when the number of the resource blocks allocated by the base station is not enough for the transmission of the channel quality information, the channel quality information into multiple data packets; and a sending sub-unit, adapted to transmit the multiple data packets to the base station through multiple continuous uplink sub-frames.

Further, the dividing sub-unit may include:

a first dividing sub-unit, adapted to, according to the number of bits of the channel quality information evenly divide the channel quality information into multiple data packets with the same number of bits; or a second dividing sub-unit, adapted to divide the channel quality information of different downlink carriers into different data packets; or a third dividing sub-unit, adapted to divide, according to the content of the channel quality information, the channel quality information with the same content into the same data packet.

In the method for transmitting the channel quality information according to the embodiment of the present invention, the number of the multiple uplink sub-frames through which the user equipment feeds back the channel quality information may be obtained through configuration of higher layer signaling or dynamic signaling.

It can be seen from the above technical solution provided by the embodiment of the present invention that, the base station stores a corresponding table between the number of bits of the channel quality information and information of the set of resource block numbers, and the base station adaptively allocates the uplink scheduling bandwidth according to the bit size of the channel quality information.

Even if the bits of the channel quality information fed back by the user equipment exceed the transmission bandwidth allocated by the base station, the user equipment can divide the channel quality information into multiple data packets, so as to satisfy the transmission performance.

The method for transmitting the channel quality information according to the embodiment of the present invention is described below with reference to an LTE-Advanced (LTE-A) system, so as to keep backward compatibility with the 3GPP_Rel-8 standard. "$I_{MCS}$=29", "CQI-request=1" and "$N_{PRB}$=n_$_{PRB\_UCI}$ (n_$_{PRB\_UCI}$∈N_$_{PRB\_UCI}$)" in the UL-grant are used to jointly indicate only UCI is transmitted on the PUSCH.

Specifically, the base station configures "$I_{MCS}$=29", "CQI-request=1" and "$N_{PRB}$=n_$_{PRB\_UCI}$ (n_$_{PRB\_UCI}$∈N_$_{PRB\_UCI}$)" in the UL-grant signaling to jointly trigger the transmission of the only UCI on the PUSCH.

The base station sends the adapted UL-grant signaling to the UE.

When determining that, "$I_{MCS}$=29" indicates a retransmitted data packet, "CQI-request=1" indicates a CQI triggering request, and $N_{PRB}$=n_$_{PRB\_UCI}$ (n_$_{PRB\_UCI}$∈N_$_{PRB\_UCI}$) in which $N_{PRB}$ is a value in n_$_{PRB\_UCI}$, the UE determines that the condition for transmission of only the UCI on the PUSCH are met, and then transmits only the UCI to the base station on the PUSCH.

Otherwise, if it is determined the condition for transmission of only the UCI on the PUSCH are not met, the transmission of only the UCI on the PUSCH is not triggered.

If the UL-grant signaling supports transmission of one TB, the above method is directly used to instruct the UE to transmit only the UCI on the PUSCH.

If the UL-grant signaling supports transmission of two TBs, both the two TBs satisfy "$I_{MCS}$=29" or only one of the two TBs satisfies "$I_{MCS}$=29", which, together with $N_{PRB}$=n_$_{PRB\_UCI}$ (n_$_{PRB\_UCI}$∈N_$_{PRB\_UCI}$) and "CQI-request=1", is used to jointly trigger the transmission of only the UCI on the PUSCH.

It can be seen from the above technical solution provided by the embodiment of the present invention that, the base station stores a corresponding table between the number of bits of the channel quality information and information of the set of resource block numbers, and the base station adaptively allocates the uplink scheduling bandwidth according to the bit size of the channel quality information.

The method for transmitting the channel quality information according to the embodiment of the present invention is described below with reference to the LTE-A system. "$I_{MCS}$=29" or "$I_{MCS}$=0", "NDI" being toggled (in a toggled state) or in a non-toggled state, "CQI-request=1", and $N_{PRB}$=n_$_{PRB\_UCI}$ (n_$_{PRB\_UCI}$∈N_$_{PRB\_UCI}$) in the UL-grant signaling are used to jointly trigger the transmission of only the UCI on the PUSCH.

Specifically, the base station configures "$I_{MCS}$=29", a toggled NDI, "NDI=0" "CQI-request=1", and $N_{PRB}$=n_$_{PRB\_UCI}$ (n_$_{PRB\_UCI}$∈N_$_{PRB\_UCI}$) in the UL-grant signaling to indicates the transmission of only the UCI, without UL-SCH data, on the PUSCH. For configuring the toggled NDI, "NDI=0" is configured if last time NDI=1, or "NDI=1" is configured if last time the NDI=0. The toggled NDI indicates the transmission of a newly data packet.

Alternatively, the base station configures "$I_{MCS}$=0", a non-toggled NDI, "CQI-request=1", and $N_{PRB}$=n_$_{PRB\_UCI}$ (n_$_{PRB\_UCI}$∈N_$_{PRB\_UCI}$) in the UL-grant signaling, so as to indicate that the transmission of only the UCI, without UL-SCH data on the PUSCH. For the non-toggled NDI, "NDI=0" is configured if last time NDI=0, or "NDI=1" is configured if last time NDI=1. The non-toggled NDI indicates a retransmitted data packet.

The base station sends the configured UL-grant signaling to the UE.

When determining that "$I_{MCS}$=29" indicates a retransmitted data packet, "the toggled NDI" indicates an initial transmission data packet, "CQI-request=1" indicates a CQI triggering request, and $N_{PRB}$=n_$_{PRB\_UCI}$ (n_$_{PRB\_UCI}$∈N_$_{PRB\_UCI}$)

in which $N_{PRB}$ is a value belonging to n_$_{PRB\_UCI}$ the UE determines that the condition for transmission of only the UCI on the PUSCH are met.

Alternatively, when determining that the "$I_{MCS}=0$" indicates an initial transmission data packet, the "non-toggled NDI" indicates a retransmitted data packet, "CQI-request=1" indicates the CQI triggering request, and $N_{PRB}$=n_$_{PRB\_UCI}$ (n_$_{PRB\_UCI}$∈N_$_{PRB\_UCI}$) in which $N_{PRB}$ is a value belonging to n_$_{PRB\_UCI}$, the UE determines that that the condition for transmission of only the UCI on the PUSCH are met.

The UE transmits only the UCI to the base station on the PUSCH.

Otherwise, the UE determines that the condition for transmission of only the UCI on the PUSCH are not met, and thus does not perform the transmission of only the UCI on the PUSCH.

If the UL-grant signaling merely supports transmission of one TB, the above method is directly used to trigger the transmission of only the UCI on the PUSCH.

If the UL-grant signaling supports transmission of two TBs, for the first TB, a toggled NDI and "$I_{MCS}=29$" are jointly used to trigger the transmission of only the UCI on the PUSCH, or a non-toggled NDI together with "$I_{MCS}=0$" are jointly used to trigger the transmission of only the UCI on the PUSCH. For the second TB, a toggled NDI and "$I_{MCS}=29$", or a non-toggled NDI and "$I_{MCS}=0$", which, in combination with $N_{PRB}$=n_$_{PRB\_UCI}$ (n_$_{PRB\_UCI}$∈N_$_{PRB\_UCI}$) and "CQI-request=1", are jointly used to trigger the transmission of only the UCI on the PUSCH.

Alternatively, for at least one of the two TBs, the toggled NDI and "$I_{MCS}=29$", or the non-toggled NDI and "$I_{MCS}=0$" combined with $N_{PRB}$=n_$_{PRB\_UCI}$ (n_$_{PRB\_UCI}$∈N_$_{PRB\_UCI}$) and "CQI-request=1", are jointly used to trigger the transmission of only the UCI on the PUSCH.

It can be seen from the above technical solution provided by the embodiment of the present invention that, the base station stores a corresponding table between the number of bits of the channel quality information and information of the set of resource block numbers, and the base station adaptively allocates the uplink scheduling bandwidth according to the bit size of the channel quality information.

It should be noted that, as for the foregoing method embodiments, for convenient description, the methods are described as a series of actions. It should be known for persons skilled in the art should know that, the present invention is not limited by the described action sequence. Some steps may be performed in other sequences or performed simultaneously, according to the present invention. Furthermore, those skilled in the art should also appreciate that all the embodiments described in the specification are preferred embodiments, and that the involved actions and modules are not necessarily required by the present invention.

In the above embodiments, the description of each embodiment has its emphasis, and some embodiments may not be detailed. Reference may be made to the relevant description of other embodiments.

Persons of ordinary skill in the art should understand that all or a part of the steps of the method according to the embodiments may be implemented by a computer program instructing relevant hardware. The program may be stored in a computer readable storage medium. When the program is run, the steps of the method according to the embodiments are performed. The storage medium may be a magnetic disk, a CD-ROM, a read-only memory (ROM), or a random access memory (RAM).

The above descriptions are merely exemplary specific embodiments of the present invention, but the protection scope of the present invention is not limited hereto. Any changes or replacements that can be easily thought of by persons skilled in the art within the technical scope of the present invention should belong to the protection scope of the present invention. Therefore, the protection scope of the present invention is subject to the claims.

What is claimed is:

1. A user equipment, comprising:
   a receiver configured to receive, from a base station, control signaling for uplink scheduling, wherein the received control signaling for uplink scheduling supports transmission of at least one transport block (TB) and includes at least one modulation and coding scheme (MCS) field, a channel quality information request field, and a resource block allocation field indicating the number of resource blocks (RBs) allocated by the base station for the user equipment to transmit channel quality information of at least one downlink carrier, the NRB being a positive integer; and
   a transmitter configured to transmit, when a condition for transmitting the channel quality information on an uplink shared channel is fulfilled, only the channel quality information on the uplink shared channel according to the allocated RBs,
   wherein if the channel quality information of multiple downlink carriers is requested to be transmitted by the user equipment, the condition for transmitting the channel quality information on the uplink shared channel includes:
      in instances where the control signaling for uplink scheduling supports only one TB, the MCS field corresponding to the TB indicates a MCS corresponding to a retransmitted data packet, and in instances where the control signaling for uplink scheduling supports transmission of two TBs, the MCS field corresponding to only one of the two TBs indicates a MCS corresponding to a retransmitted data packet;
      the channel quality information request field indicates a request for transmitting the channel quality information; and
      the value of the resource block allocation field is equal to or less than a threshold, wherein the threshold is determined by the number of the multiple downlink carriers, denoted by N, and a maximum number of RBs which are available to be allocated for transmission of channel quality information of one downlink carrier, where N is a positive integer.

2. The user equipment according to claim 1, wherein if the control signaling for uplink scheduling supports transmission of multiple TBs, the condition further includes that the received control signaling for uplink scheduling indicates a rank value.

3. The user equipment according to claim 1, wherein the number of the multiple TBs is 2.

4. The user equipment according to claim 1, wherein a value of the MCS field indicating the MCS corresponding to the retransmitted data packet is 29.

5. A method for transmitting channel quality information in a communications system, comprising:
   receiving, by a user equipment from a base station, control signaling for uplink scheduling, wherein the received control signaling for uplink scheduling supports transmission of at least one transport block (TB) and includes at least one modulation and coding scheme (MCS) field, a channel quality information request field, and a resource block allocation field indicating the number of resource blocks (RBs) allocated by the base station for the user equipment to transmit channel quality information of at least one downlink carrier, the number of resource blocks being a positive integer; and transmitting, by the user equipment, when a condition for transmitting the channel quality information on an uplink shared channel is fulfilled, only the channel quality information on the uplink shared channel according to the allocated RBs, wherein if the channel quality information of multiple downlink carriers is requested to be transmitted by the user equipment, the condition for transmitting only the channel quality information on the uplink shared channel includes:

in instances where the control signaling for uplink scheduling supports only one TB, the MCS field corresponding to the TB indicates a MCS corresponding to a retransmitted data packet, and in instances where the control signaling for uplink scheduling supports transmission of two TBs, the MCS field corresponding to only one of the two TBs indicates a MCS corresponding to a retransmitted data packet;

the channel quality information request field indicating a request for transmitting the channel quality information; and the value of the resource block allocation field is equal to or less than a threshold, wherein the threshold is determined by the number of the multiple downlink carriers, denoted by N, and a maximum number of RBs which are available to be allocated for transmission of channel quality information of one downlink carrier, wherein N is a positive integer.

6. The method according to claim 5, wherein if the control signaling for uplink scheduling supports transmission of multiple TBs, the condition further includes that the received control signaling for uplink scheduling indicates a rank value.

7. The method according to claim 5, wherein the number of the multiple TBs is 2.

8. The method according to claim 5, wherein a value of the MCS field indicating the MCS corresponding to the retransmitted data packet is 29.

9. A communications system including a user equipment configured to be communicatively connectable to a base station, wherein the user equipment is configured to:

receive, from the base station, control signaling for uplink scheduling, wherein the received control signaling for uplink scheduling supports transmission of at least one transport block (TB) and includes at least one modulation and coding scheme (MCS) field, a channel quality information request field, and a resource block allocation field indicating the number of resource blocks (RBs) allocated by the base station for the user equipment to transmit channel quality information of at least one downlink carrier, the number of resource blocks being a positive integer; and transmit, when a condition for transmitting the channel quality information on an uplink shared channel is fulfilled, only the channel quality information on the uplink shared channel according to the allocated RBs, wherein if the channel quality information of multiple downlink carriers is requested to be transmitted by the user equipment, the condition for transmitting the channel quality information on the uplink shared channel includes:

in instances where the control signaling for uplink scheduling supports only one TB, the MCS field corresponding to the TB indicates a MCS corresponding to a retransmitted data packet, and in instances where the control signaling for uplink scheduling supports transmission of two TBs, the MCS field corresponding to only one of the two TBs indicates a MCS corresponding to a retransmitted data packet;

the channel quality information request field indicating a request for transmitting the channel quality information; and the value of the resource block allocation field is equal to or less than a threshold, wherein the threshold is determined by the number of the multiple downlink carriers, denoted by N, and a maximum number of RBs which are available to be allocated for transmission of channel quality information of one downlink carrier, wherein N is a positive integer.

10. The system according to claim 9, wherein if the control signaling for uplink scheduling supports transmission of multiple TBs, the condition further includes:

the received control signaling for uplink scheduling indicates a rank value.

11. The system according to claim 9, wherein the number of the multiple TBs is 2.

12. The system according to claim 9, wherein a value of the MCS field indicating the MCS corresponding to the retransmitted data packet is configured to be equal to 29.

13. The user equipment according to claim 1, wherein the threshold equals to 4*N, wherein N is a positive integer and corresponds to the number of the multiple downlink carriers.

14. The user equipment according to claim 1, wherein if the channel quality information of one downlink carrier is requested to be transmitted by the user equipment, the condition for transmitting channel quality information on the uplink shared channel includes:

in instances where the control signaling for uplink scheduling supports transmission of one TB, the MCS field corresponding to the TB indicates a MCS corresponding to a retransmitted data packet, and in instances where the control signaling for uplink scheduling supports transmission of two TBs, the MCS field corresponding to only one of two TBs indicates a MCS corresponding to a retransmitted data packet;

the channel quality information request field indicates a request for transmitting the channel quality information of multiple downlink carriers; and the value of the resource block allocation field is equal to or less than 4.

15. The user equipment according to claim 1, wherein a value of the channel quality information request field is configured to be equal to 1.

16. The method according to claim 5, wherein the threshold equals to 4*N, wherein N is a positive integer and corresponds to the number of the multiple downlink carriers.

17. The method according to claim 5, wherein if the channel quality information of one downlink carrier is requested to be transmitted by the user equipment, the condition for transmitting channel quality information on the uplink shared channel includes:

in instances where the control signaling for uplink scheduling supports transmission of only one TB, the MCS field corresponding to the TB indicates a MCS corresponding to a retransmitted data packet, and in instances where the control signaling for uplink scheduling supports transmission of two TBs, the MCS field corresponding to only one of the two TBs indicates uplink scheduling supports transmission of the two TBs;

the channel quality information request field indicates a request for transmitting the channel quality information of multiple downlink carriers; and the value of the resource block allocation field is equal to or less than 4.

18. The method according to claim 5, wherein a value of the channel quality information request field is configured to be equal to 1.

19. The communications system according to claim 9, wherein the threshold equals to 4*N, wherein N is a positive integer and corresponds to the number of the multiple downlink carriers.

20. The communications system according to claim 9, wherein if the channel quality information of one downlink carrier is requested to be transmitted by the user equipment, the condition for transmitting channel quality information on the uplink shared channel includes:

in instances where the control signaling for uplink scheduling supports transmission of one TB, the MCS field corresponding to the TB indicates a MCS corresponding to a retransmitted data packet, and in instances where the control signaling for uplink scheduling supports transmission of two TBs, the MCS field corresponding to only one of the two TBs indicates a MCS corresponding to a retransmitted data packet;

the channel quality information request field indicates a request for transmitting the channel quality information of multiple downlink carriers; and the value of the resource block allocation field is equal to or less than 4.

21. The communications system according to claim 1, wherein a value of the channel quality information request field is configured to be equal to 1.

22. A non-transitory computer readable storage medium, comprising computer program code which, when executed by a computer processor, causes the compute processor to execute the steps of:

instructing user equipment communicatively connected to the processor to receive control signaling for uplink scheduling, wherein the received control signaling supports transmission of at least one transport block (TB) and includes at least one modulation and coding scheme (MCS) field, a channel quality information request field, and a resource block allocation field indicating the number of resource blocks (RBs) allocated by a base station for the user equipment to transmit channel quality information of at least one downlink carrier, the number of RBs being a positive integer; and instructing the user equipment to transmit only the channel quality information on the uplink shared channel according to the allocated RBs when a condition for transmitting the channel quality information on an uplink shared channel is fulfilled, wherein if the channel quality information of multiple downlink carriers is requested to be transmitted by the user equipment, the condition for transmitting the channel quality information on the uplink shared channel includes:

in instances where the control signaling for uplink scheduling supports transmission of one TB, the MCS field corresponding to the TB indicates a MCS corresponding to a retransmitted data packet, and in instances where the control signaling for uplink scheduling supports transmission of two TBs, the MCS field corresponding to one of the two TBs indicates a MCS corresponding to a retransmitted data packet;

the channel quality information request field indicating a request for transmitting the channel quality information; and the value of the resource block allocation field is equal to or less than a threshold, wherein the threshold is determined by the number of the multiple downlink carriers, denoted by N, and a maximum number of RBs which are available to be allocated for transmission of channel quality information of one downlink carrier, wherein N is a positive integer.

* * * * *